(No Model.)

E. G. SMITH.
ELECTRICAL PRESSURE INDICATOR FOR STEAM GAGES.

No. 490,725. Patented Jan. 31, 1893.

Witnesses
Albert D. Blackwood
Jos H Blackwood

Inventor
Edward G. Smith,
by J. M. Yznaga,
Attorney

UNITED STATES PATENT OFFICE.

EDWARD G. SMITH, OF SAN JOSÉ, CALIFORNIA.

ELECTRICAL PRESSURE-INDICATOR FOR STEAM-GAGES.

SPECIFICATION forming part of Letters Patent No. 490,725, dated January 31, 1893.

Application filed July 6, 1892. Serial No. 439,096. (No model.)

*To all whom it may concern:*

Be it known that I, EDWARD G. SMITH, a citizen of the United States, residing at San José, in the county of Santa Clara and State of California, have invented certain new and useful Improvements in Electrical Pressure-Indicators for Steam-Gages; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to electrical means for indicating and announcing the pressure which a steam or similar gage may make or reach, either at minimum or maximum points; and the invention consists in an improved circuit-closing means attached to a pressure-gage, hereinafter specified, and particularly as the same is laid and pointed out in the claims.

I have fully and clearly illustrated the invention in the accompanying drawings, wherein—

Figure 1:
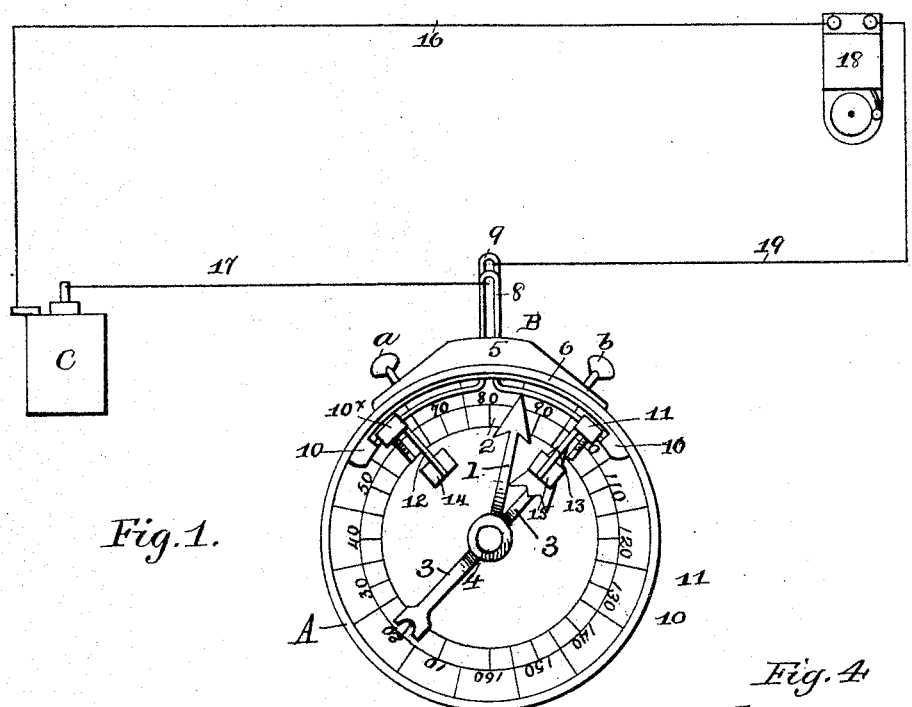
Figure 2:
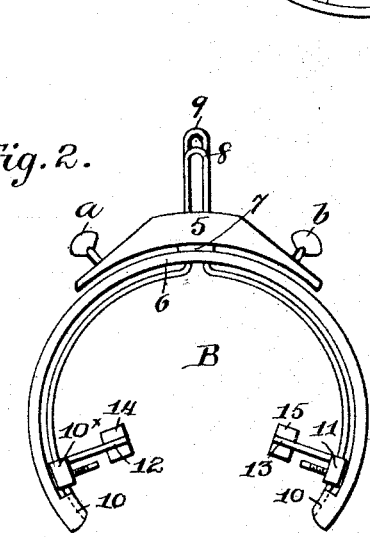
Figure 4:
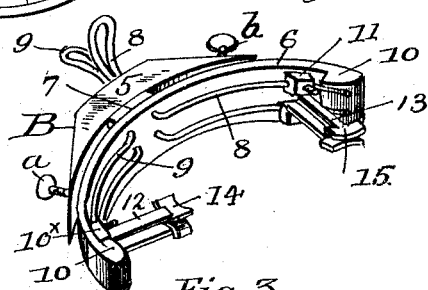
Figure 3:
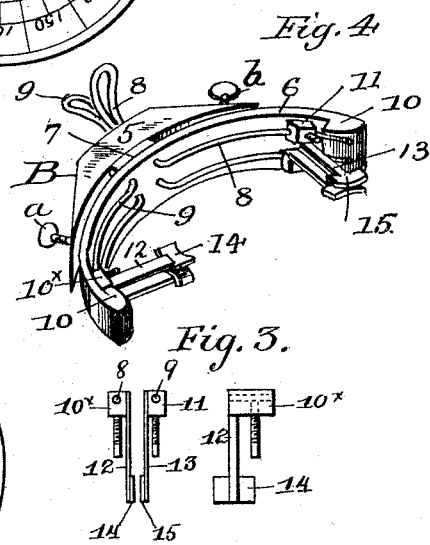

Figure 1 is a face view of an ordinary steam-gage, having my improvements applied thereto; a battery and connections being shown associated therewith. Fig. 2 is a detail view of my detachable and adjustable circuit-closer removed from the gage; the arms and wires thereof being longer than those shown in Fig. 1. Fig. 3 is a detail of one of the contact arms removed from its wire and a detail showing the relative position of the contact-arms, and Fig. 4 is a perspective of the attachment showing the arrangement of the wires and the contact-arms supported thereby.

A designates an ordinary gage-case, in which is journaled or pivoted an indicator or pointer 1, as usual, which traverses the dial 2, of the gage and on the same arbor or pivot that carries the pointer 1, is adjustably mounted another pointer 3, which is insulated at the bearing, as seen at 4, so that the current will not be diverted from the course intended when closed by the pointer contacting with the contact-pieces.

B designates my improved and novel attachment, consisting of two concentrically arranged pieces 5, and 6, connected by a bridge or neck-piece 7, and formed to set over and clamp on the rim of the gage-case, by means of screws $a$, $b$, as shown. This attachment is made of non-conducting material, preferably vulcanized rubber, and has embedded therein the wires 8, 9, substantially as shown. To hold the wires at their free ends, the arms 6, being the under portion, may be thickened, as at 10, and have grooves in them wherein the wires are disposed, and held; this construction leaves the wires from the point of turning to the points 10, free from contact with the arms or extensions of the part 6, so as to permit the arms of the contact-pieces to be adjustable thereon.

On the wires 8, 9, are arranged adjustable sleeves $10^\times$, 11, from which extend light-spring arms 12, 13, having on their ends contact pieces 14, 15, standing normally apart and free from each other, so that unless communication is made between the contact pieces, the circuit from the battery remains open and broken; this communication or continuation of the circuit, is made by means of the end of the arm or pointer 3, being moved between the contact pieces, which establishes the circuit between the battery and the alarm.

C, designates the battery from which proceed the circuit wires 16, 17, the latter of which is connected to the loop of the wires 8, and the former running to the bell or other alarm 18. A wire 19, runs from the loop of the wires 9 to the bell as shown to complete the circuit.

The attachment B, is applied to the gage-case by simply forming a notch or recess 20, in the rim of the case, which does not injure or interfere with the gage. While the attachment B, may be made a fixed or permanent part of the gage, it is not essentially so, as it can be attached to any gage case. By extending the arms of the attachment farther around the rim of the gage, as indicated in Fig. 2 of the drawings, the pointer 3 may be utilized to give the alarm at maximum and minimum pressure-points, by simply adjusting the sleeves $10^\times$, and 11, on the wires, to the points desired on the dial, and this is the purpose of having the two sets of spring arms. By cutting the wire loops projecting above or from the body of the attachment, and properly connecting the circuit-wires thereto, the two wires to the left would sound the alarm at the minimum gage, and the two to the right sound the maximum alarm.

As heretofore mentioned, the invention is applicable to any pressure gage, without materially changing the construction of the gage, or interfering with its operation.

The attachment is particularly useful on dental-vulcanizing apparatus, where the temperature has to be maintained at a uniform degree for a specified time, and where under existing practice the gage has to be watched so that the pressure will not advance beyond the point demanded or fall below it.

Having thus described my invention, what I claim and desire to secure by Letters Patent is—

1. In an electric pressure-indicator, the attachment B, consisting of a non-conducting support, adapted to be fixed to a pressure-gage, wires held in the support, adjustable arms on the wires provided with contacts on the free ends, and a pointer pivoted in the gage, arranged to move between the contacts of the arms, as and for the purpose specified.

2. In a pressure-gage, the combination of a pressure-pointer journaled in the gage, an adjustable circuit closing pointer journaled on the arbor of the pressure-pointer, a non-conducting support on the rim of the gage, circuit-wires held in the support, adjustable-arms on the wires standing with their free ends normally open, and arranged to receive the end of the adjustable circuit-closing pointer, and establish the circuit, substantially as and for the purpose specified.

In testimony whereof I affix my signature in presence of two witnesses.

EDWARD G. SMITH.

Witnesses:
 W. C. BAILEY,
 SILAS ST. JOHN.